United States Patent
Nguyen et al.

(10) Patent No.: US 12,095,917 B2
(45) Date of Patent: Sep. 17, 2024

(54) SECURELY TRANSPORTING A ROOT KEY USING A PRIVATELY/PUBLIC KEY PAIR FOR USER-CONTROLLED AUTHENTICATION OF NODES IN A HARDWARE SECURITY MODULE CLUSTER

(71) Applicant: INTERNATIONAL BUSINESS MACHINES CORPORATION, Armonk, NY (US)

(72) Inventors: David Nguyen, Wake Forest, NC (US); Marco Pavone, Ehningen (DE); Clifford Lee Hansen, Rochester, MN (US); Garry Joseph Sullivan, Rochester, MN (US); Ross Martin Heninger, Selma, NC (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 17/447,315

(22) Filed: Sep. 10, 2021

(65) Prior Publication Data
US 2023/0081068 A1 Mar. 16, 2023

(51) Int. Cl.
*H04L 9/08* (2006.01)
*H04L 9/30* (2006.01)
*H04L 9/32* (2006.01)

(52) U.S. Cl.
CPC .......... *H04L 9/0897* (2013.01); *H04L 9/0819* (2013.01); *H04L 9/30* (2013.01); *H04L 9/3247* (2013.01); *H04L 2209/12* (2013.01)

(58) Field of Classification Search
CPC ....... H04L 9/0897; H04L 9/0819; H04L 9/30; H04L 9/3247; H04L 2209/12;
(Continued)

(56) References Cited

U.S. PATENT DOCUMENTS

| 7,103,912 B2 | 9/2006 | Chenhong |
| 7,463,739 B2 | 12/2008 | Couillard |

(Continued)

FOREIGN PATENT DOCUMENTS

| CN | 107533616 A | 1/2018 |
| KR | 20130048508 A | 5/2013 |

(Continued)

OTHER PUBLICATIONS

ISR and WO, date of Mailing: Dec. 6, 2022, International application No. PCT/EP2022/075096, International Filing Date: Sep. 9, 2022, 11 pages.

(Continued)

*Primary Examiner* — Bryan F Wright
(74) *Attorney, Agent, or Firm* — Schmeiser, Olsen & Watts, LLP; Edward Wixted

(57) ABSTRACT

An approach is provided for distributing a root key to a hardware security module (HSM) of an HSM cluster. A signed first command is transmitted to a source HSM to create a master key. A fingerprint of the master key is received in a response signed by the source HSM using a module signing key hardcoded into the source HSM at manufacturing time. A second command is transmitted to a first HSM to generate an importer key pair. A request is transmitted to the source HSM to create and export a wrapped master key. The master key wrapped with a transport key is received. The wrapped master key is transmitted to the first HSM. The master key is activated in the first HSM.

25 Claims, 7 Drawing Sheets

(58) Field of Classification Search
CPC ... H04L 9/0643; H04L 9/0836; H04L 9/0877; G06F 21/57
USPC ........................................................ 713/189
See application file for complete search history.

(56) References Cited

U.S. PATENT DOCUMENTS

| | | |
|---|---|---|
| 8,953,790 B2 | 2/2015 | Qi |
| 9,037,865 B1 | 5/2015 | Gopalakrishna |
| 9,112,680 B2 | 8/2015 | Baentsch |
| 9,367,697 B1 | 6/2016 | Roth |
| 9,948,624 B2 | 4/2018 | Su |
| 10,178,078 B1 | 1/2019 | Boyer et al. |
| 10,305,688 B2 | 5/2019 | Fu |
| 10,554,392 B2 | 2/2020 | Rubin |
| 2016/0043864 A1 | 2/2016 | Fedronic |
| 2016/0149877 A1 | 5/2016 | Kancharla |
| 2016/0261408 A1 | 9/2016 | Peddada |
| 2018/0176013 A1 | 6/2018 | Cheng |
| 2018/0367311 A1 | 12/2018 | Stahlberg |
| 2018/0367316 A1* | 12/2018 | Cheng .................... G06F 21/72 |
| 2019/0305938 A1 | 10/2019 | Sandberg-Maitland |
| 2020/0153623 A1* | 5/2020 | Asanghanwa ........ H04L 9/3213 |
| 2020/0177374 A1 | 6/2020 | Coon |
| 2020/0285746 A1 | 9/2020 | Buendgen |
| 2022/0029801 A1* | 1/2022 | Velagapalli ........... H04L 9/0894 |

FOREIGN PATENT DOCUMENTS

| | | | |
|---|---|---|---|
| TW | 201635185 A | 10/2016 | |
| TW | 202038114 A | 10/2020 | |
| WO | WO-2011006912 A1 * | 1/2011 | ............. G06F 21/33 |

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

SECURELY TRANSPORTING A ROOT KEY USING A PRIVATELY/PUBLIC KEY PAIR FOR USER-CONTROLLED AUTHENTICATION OF NODES IN A HARDWARE SECURITY MODULE CLUSTER

BACKGROUND

The present invention relates to managing computing infrastructure resources, and more particularly to initializing a hardware security module (HSM) cluster and securely distributing encryption keys throughout the HSM cluster.

Known key management services offered by cloud service providers include a Bring Your Own Key feature, which allows a user to import a user key or a randomly generated key in an HSM, which is then used with envelope encryption to encrypt data at rest. Data services, such as database-as-a-service and infrastructure services integrate with the known key management services to use key-encrypting-keys that securely store data encryption keys locally in their service and decrypt the data by accessing the key management service to unwrap the data encryption key. A known key management service allows a user to generate a root key (also known as a wrapping key or a master key) on a system the user controls that is outside the key management service and further allows the user to upload the root key via a key ceremony. The user is burdened by needing to maintain physical security and processes around managing the copy of the root key.

Accordingly, there is a need for a root key distribution system that protects data in a cloud computing environment with the use of key encrypting keys, but with user ownership and exclusive control of the root key of the key hierarchy.

SUMMARY

In one embodiment, the present invention provides a computer system that includes a central processing unit (CPU), a memory coupled to the CPU, and one or more computer readable storage media coupled to the CPU. The one or more computer readable storage media collectively contain instructions that are executed by the CPU via the memory to implement a method of distributing a root key to a hardware security module (HSM) of an HSM cluster. The method includes the computer system transmitting a first command to a source HSM to create a master key. The first command is signed by an administrator of HSMs in the HSM cluster. The method further includes the computer system receiving, from the source HSM, a fingerprint of the master key in a response signed by the source HSM using a module signing key hardcoded into the source HSM at a manufacturing time of the source HSM. The method further includes the computer system transmitting a second command to a first HSM in the HSM cluster. The second command generates an importer key pair comprising an importer private key and an importer public key. The method further includes in response to the transmitting the second command, the computer system receiving the importer public key from the first HSM. The method further includes the computer system transmitting to the source HSM a request to export the master key and the importer public key. The method further includes in response to the transmitting the request, the computer system receiving from the source HSM (i) the master key wrapped with a transport key and (ii) an exporter public key. The transport key is derived from the importer public key and an exporter private key. The method further includes the computer system transmitting, to the first HSM, (i) the master key wrapped with the transport key and (ii) the exporter public key. The method further includes the computer system activating the master key in the first HSM.

The aforementioned embodiment advantageously allows the customer or end user to authenticate each of the nodes of the HSM cluster that is holding the root key to ensure that each node is a trusted destination.

In an optional aspect of the present invention, the method further includes the computer system using the activated master key as a root key in a key management service, which provides a customer or end user with a total control over encryption keys that protect data in a cloud computing environment without requiring a management of the root key outside of the key management service, and which prevents a cloud service provider from accessing the data. The aforementioned aspect of the present invention advantageously requires an end user and a remote system to authorize the actions of root key distribution, rather than relying on a difficult coordination between two HSMs used to maintain the root key in a key management service.

In another optional aspect of the present invention, the method further includes subsequent to the transmitting the master key and the exporter public key, the first HSM deriving the transport key from the exporter public key and the importer private key stored by the first HSM. The method further includes the first HSM unwrapping the master key with the transport key. The method further includes the first HSM registering the unwrapped master key as a new master key in a register of the first HSM in an uncommitted state. The aforementioned aspect of the present invention advantageously uses ephemeral keys to securely transport the root key rather than using a less secure shared secret across all nodes in an HSM cluster.

In another optional aspect of the present invention, the method further includes the computer system transmitting a command to a second HSM in the HSM cluster to generate a second importer key pair comprising a second importer private key and a second importer public key. The second importer key pair is different from the importer key pair. The method further includes the computer system receiving the second importer public key from the second HSM. The method further includes the computer system transmitting to the source HSM a request to export the master key and the second importer public key. The method further includes the computer system receiving from the source HSM (i) the master key wrapped with a second transport key and (ii) a second exporter public key, the second transport key being different from the transport key and derived from the second importer public key and a second exporter private key. The method further includes the computer system transmitting, to the second HSM, (i) the master key wrapped with the second transport key and (ii) the second exporter public key, wherein the second HSM derives the second transport key from the second exporter public key and the second importer private key stored by the second HSM, unwraps the master key with the second transport key, and registers the master key in a register of the second HSM in an uncommitted state. The method further includes the computer system setting the master key registered in the second HSM to a committed state and activating the master key stored by the second HSM. The aforementioned aspect of the present invention advantageously uses ephemeral keys to securely transport the root key rather than using a less secure shared secret across all nodes in an HSM cluster used to hold the root key of the key hierarchy.

A computer program product and a method corresponding to the above-summarized computer system are also described herein. The advantages discussed above relative to the computer system also apply to the computer program product and method.

DETAILED DESCRIPTION

Overview

Figure 1:
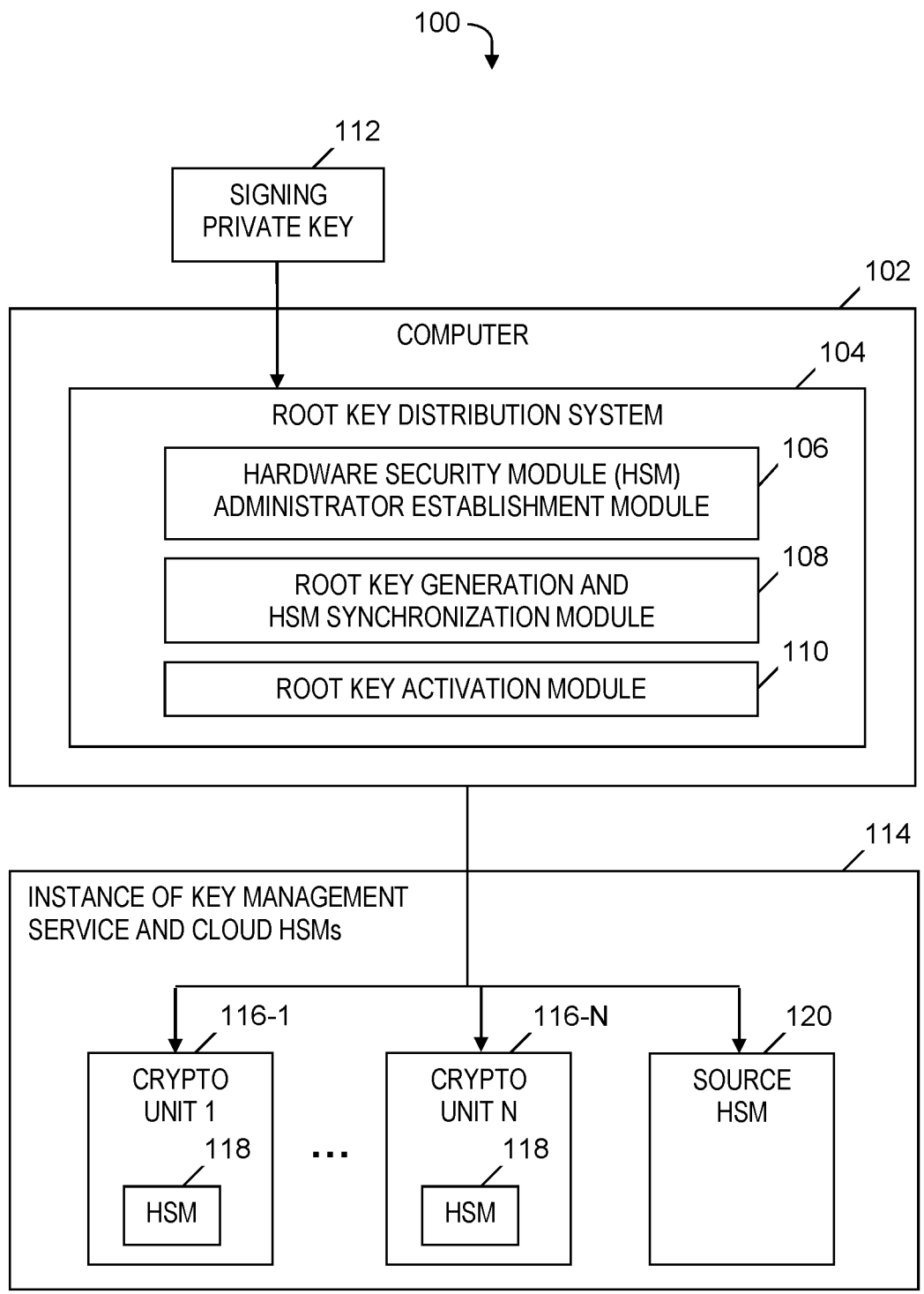
FIG. 1 is a block diagram of a system for securely distributing a root key to an HSM in an HSM cluster, in accordance with embodiments of the present invention.

In a conventional key management service in a cloud environment, maintenance of a root key involves coordination between two nodes (i.e., two HSMs) and a shared secret across all nodes in a cluster used to hold the root key of the key hierarchy, which allows the cloud service provider to access encryption keys in an HSM, thereby preventing the user who is encrypting data in the cloud environment from having full control of the access to the encryption keys. Further, in a cloud computing environment in which the end user wants to secure the end user's encryption key, another party may have physical access to the system and may have the ability to log in and clone the domain key without the end user's knowledge. As used herein, a node is a node in an HSM cluster and is also referred to as an HSM.

Embodiments of the present invention address the aforementioned unique challenges of managing the root key by protecting data in the cloud environment with the use of key encrypting keys, but with the user having ownership and exclusive control of the root key of the key hierarchy. Embodiments of the present invention require an end user and a remote system to authorize key management actions, rather than using the conventional coordination between two nodes to maintain the root key. Embodiments of the present invention use ephemeral keys to securely transport the root key, rather than using the known technique of using a shared secret across all nodes in the HSM cluster used to hold the root key. Embodiments of the present invention allow the user to authenticate each of the nodes in the HSM cluster that is holding the root key to ensure the destination is a trusted destination. The user has total control of the authorization of the distribution process and the authentication of the destinations, where the distribution process distributes the root key of a key hierarchy used to protect data in multiple cloud services to nodes in an HSM cluster without the need to generate or protect a copy of the root key outside the HSM cluster.

In one embodiment, the root key distribution system uses the activated master key as a root key in a key management service, which provides a customer or end user with a total control over encryption keys that protect data in a cloud computing environment without requiring a management of the root key outside of the key management service, and which prevents a cloud service provider from accessing the data.

In one embodiment, a root key distribution system establishes the administrator of HSMs (i.e., nodes) of an HSM cluster, uploads private/public key pairs to the nodes for authorization of commands for a given node after the node is taken out of imprint mode, generates a root key, synchronizes the nodes in response to a user authorizing the process by using a key management service (e.g., IBM® Cloud Trusted Key Entry (TKE)) in a cloud computing environment, and uses the root key in the key management service to protect data in the cloud computing environment. IBM is a registered trademark of International Business Machines Corporation located in Armonk, New York.

In one embodiment, the root key distribution system described herein allows a user to protect data via a control of a key hierarchy, without the need for managing the root key outside of the key management service. The first (i.e., top) level of the key hierarchy includes the HSM root key (i.e., master key), which is stored in the HSM, set by a user via TKE command line interface (CLI) or smart cards, and whose backups are stored only on the client. The second level in the key hierarchy includes customer root keys (CRKs), which are stored only in wrapped form by the Hyper Protect Crypto Services (HPCS), created randomly by HSM or imported by an API, and backed up within geographic region by HPCS. The third level in the key hierarchy includes data encryption keys (DEKs), which are stored in wrapped form by an application or other service, created randomly by HSM or imported by an API, and are backed up by an application using the DEK.

System for Distributing a Root Key to an Hsm of an Hsm Cluster

FIG. 1 is a block diagram of a system 100 for securely distributing a root key to an HSM in an HSM cluster, in accordance with embodiments of the present invention. System 100 includes a computer 102 that includes a software-based root key distribution system 104, which includes an HSM administrator establishment module 106, a root key generation and HSM synchronization module 108, and a root key activation module. In one embodiment, root key distribution system 104 is included in an IBMR Trusted Key Entry workstation).

Root key distribution system 104 receives a signing private key 112 from a computer system (not shown) of an administrator. System 100 also includes an instance of key management service and cloud HSMs 114 in communication with root key distribution system 104. The instance of key management service and cloud HSMs 114 can be, for example, an IBM® Hyper Protect Crypto Services instance.

Instance of key management service and cloud HSMs 114 includes a cluster of crypto units 116-1, . . . 116-N, where N is an integer greater than one. A crypto unit is a singular unit representing an HSM and the corresponding software stack. The cluster of crypto units 116-1, . . . , 116-N operates as one logical entity for key management and key governance. Each of the crypto units 116-1, . . . , 116-N includes an HSM 118 (i.e., a cloud HSM), which collectively comprise an HSM cluster. A cloud HSM is a tamper-resistant and tamper-evident hardware device configured to securely manage, process, and store cryptographic keys.

Instance of key management service and cloud HSMs 114 also includes a source HSM 120, which is also a hardware security module. HSM 120 creates a master key, creates an exporter key pair, derives a transport key, and wraps the master key with the transport key. In one embodiment, each of the crypto units 116-1, . . . , 116-N includes a key management service application programming interface (KMS API) (not shown) and an Enterprise Public-Key Cryptography Standards (PKCS) #11 application programming interface (EP11 API) (not shown). The KMS API manages keys for a key management service. The EP11 API provides remote access to instance 114 (e.g., IBMR Hyper Protect Crypto Services instance) for data encryption and management.

HSM administrator establishment module 106 establishes the administrator of the HSMs of the HSM cluster. For example, IBMR Crypto Express cards provides a capability for establishing the administrator of the HSMs. HSM administrator establishment module 106 uploads a certificate from a private/public key pair to each HSM 118. Root key distribution system 104 uses the certificate to authorize commands for a given node in the HSM cluster after the given node is taken out of imprint mode.

Root key generation and HSM synchronization module 108 generates a root key and synchronizes the nodes in the HSM cluster in response to a user authorizing the root key distribution process by using a TKE client.

Root key activation module 110 activates a pending root key in instance of key management service and cloud HSMs 114 to protect data in a cloud computing environment.

The functionality of the components shown in FIG. 1 is described in more detail in the discussion of FIGS. 2A-2C and FIG. 3 presented below.

Process for Distributing a Root Key to an HSM of an HSM Cluster

Figure 2A:
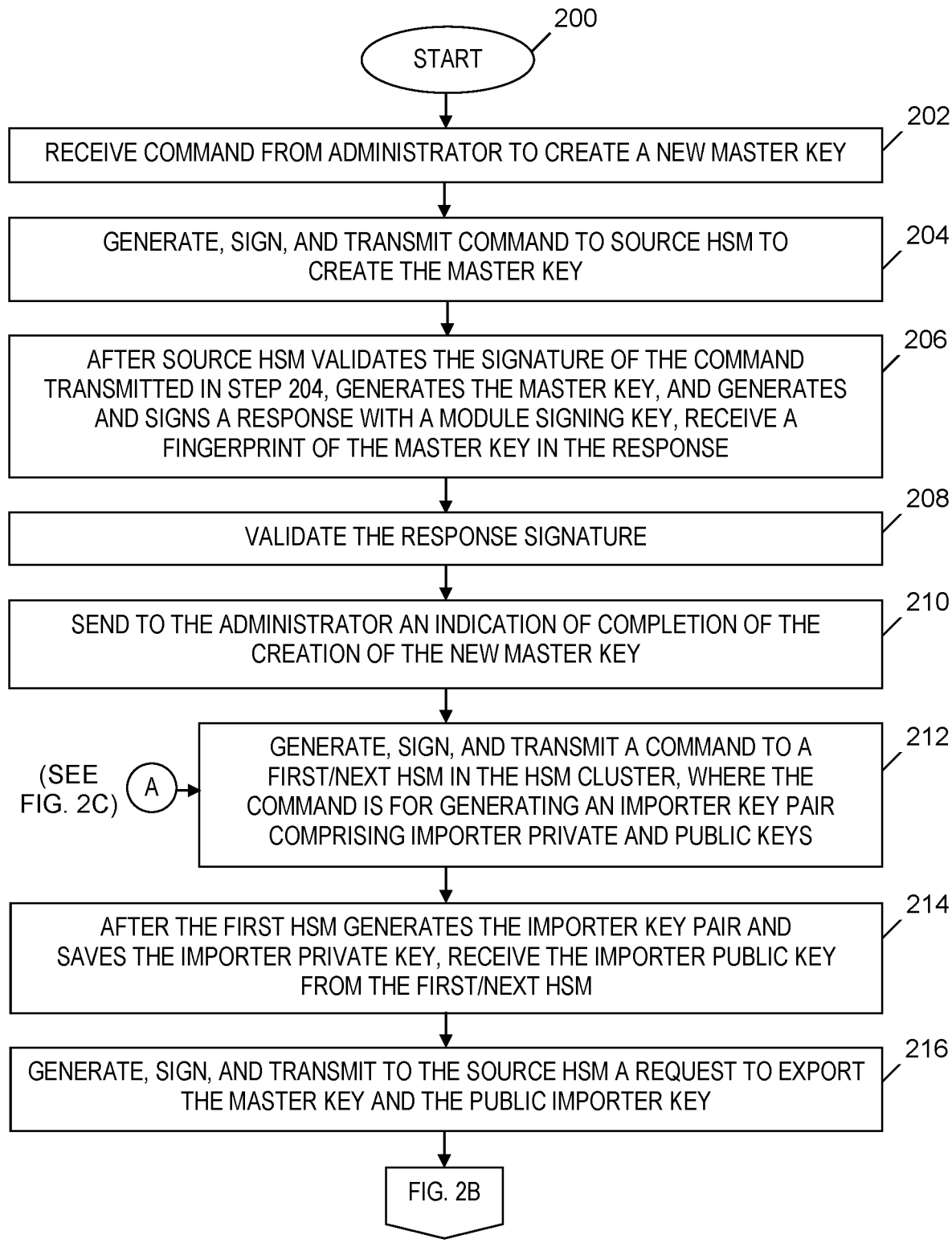
FIGS. 2A-2C depict a flowchart of a process of securely distributing a root key to an HSM in an HSM cluster, in accordance with embodiments of the present invention.
Figure 2B:
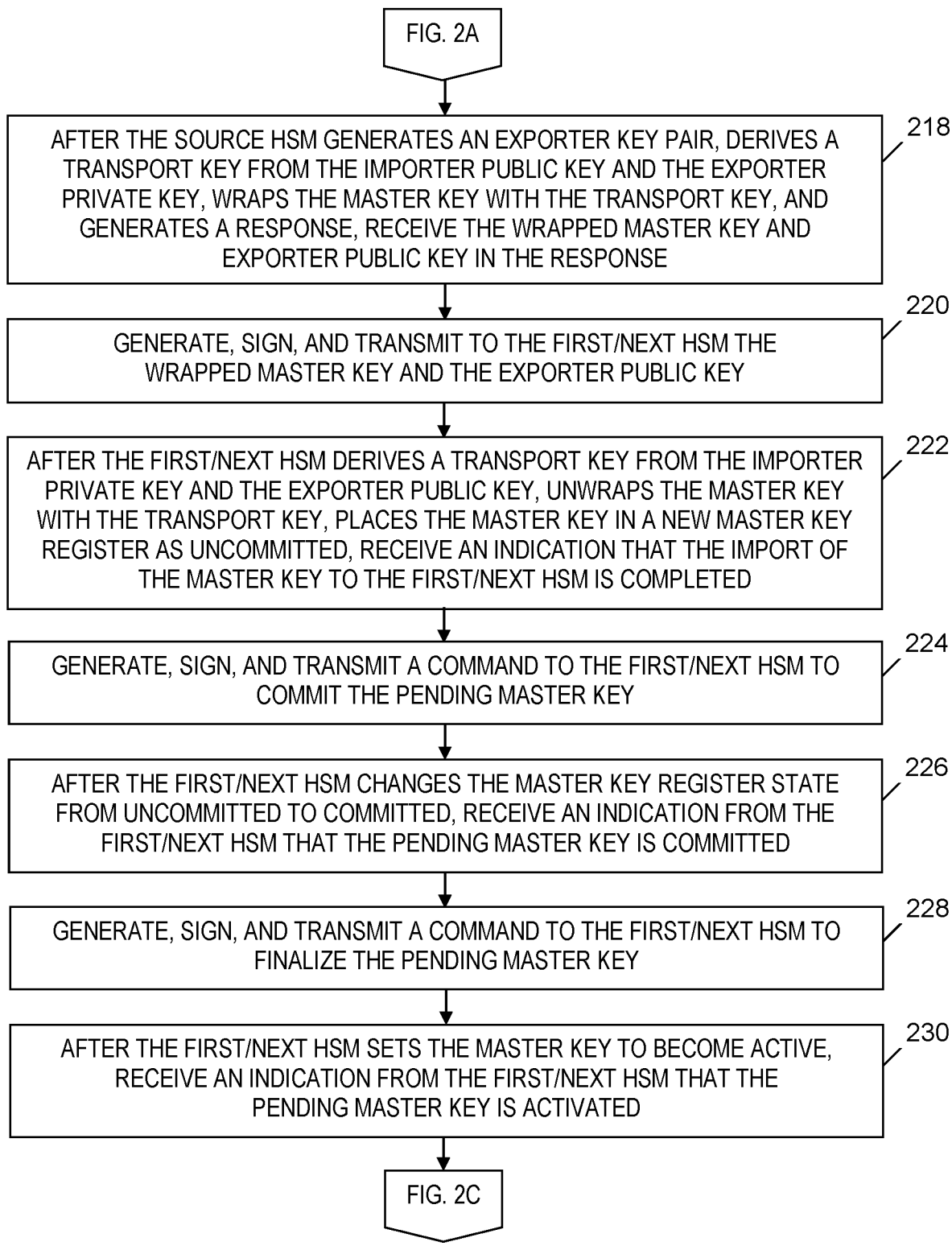
Figure 2C:
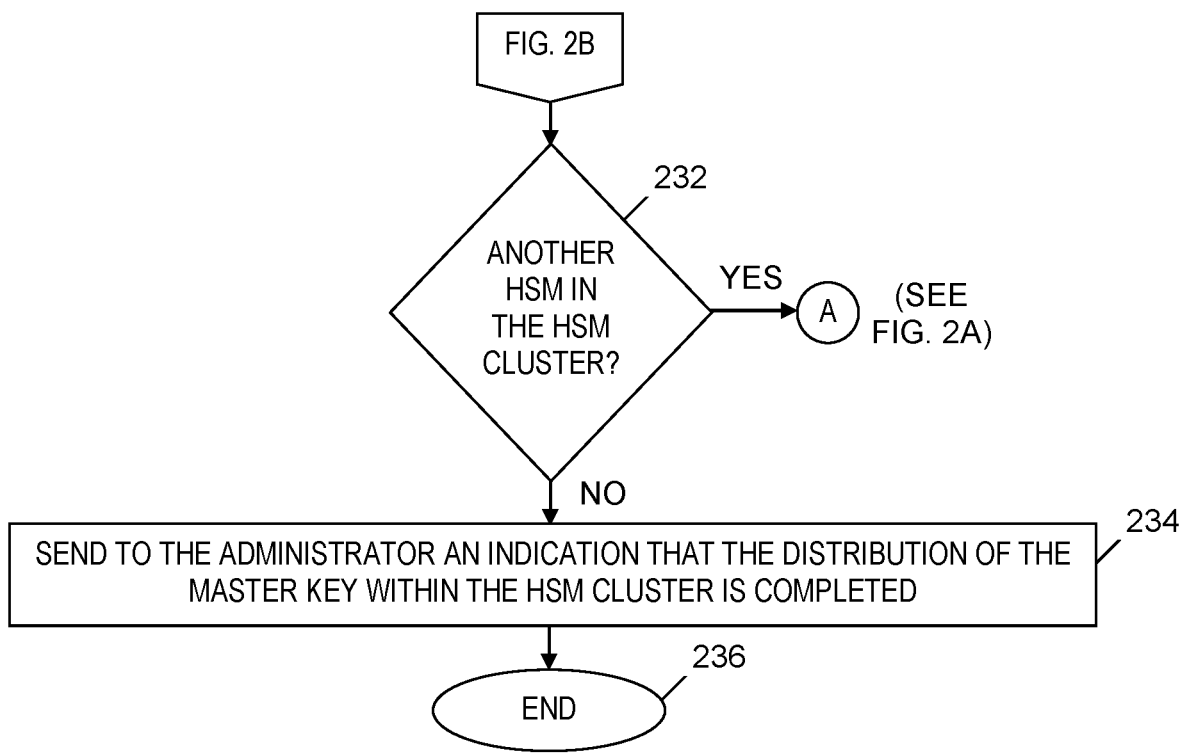

FIGS. 2A-2C depict a flowchart of a process of securely distributing a root key to an HSM in an HSM cluster, in accordance with embodiments of the present invention. The process of FIGS. 2A-2C begins at a start node 200 in FIG. 2A. In step 202, root key distribution system 104 (see FIG. 1) receives a command from a computer system of an administrator to create a new master key. As used herein, a master key is a synonym for a root key. A master key is an encryption key used to protect the instance of key management service and cloud HSMs 114 (see FIG. 1) by encrypting contents of HSMs 118 (see FIG. 1) and securing cryptographic operations.

In step 204, root key distribution system 104 (see FIG. 1) generates, signs, and transmits to source HSM 120 (see FIG. 1) a command to create the master key. Root key distribution system 104 (see FIG. 1) signs the command to create the master key by using the signing private key 112 (see FIG. 1).

Subsequent to step 204 and prior to step 206, source HSM 120 (see FIG. 1) receives the command transmitted in step 204, validates the signature of the command transmitted in step 204, generates the master key (also referred to herein as the new master key), and generates and signs a response with a module signing key, which is hard coded into source HSM 120 (see FIG. 1) at the time of manufacture of source HSM 120 (see FIG. 1).

In step 206, root key distribution system 104 (see FIG. 1) receives a fingerprint of the master key in the response generated with the module signing key after step 204 and prior to step 206.

In step 208, root key distribution system 104 (see FIG. 1) validates the signature of the response generated with the module signing key after step 204 and prior to step 206.

In step 210, root key distribution system 104 (see FIG. 1) sends to the computer system of the administrator an indication of completion of the creation of the new master key.

In step 212, root key distribution system 104 (see FIG. 1) generates, signs, and transmits a command to a first HSM (i.e., HSM 118 in crypto unit 116-1 in FIG. 1) in the HSM cluster. The command transmitted in step 212 is for generating an importer key pair comprising an importer private key and an importer public key.

Subsequent to step 212 and prior to step 214, the first HSM receives the command transmitted in step 212, generates the importer key pair, and saves the importer private key.

In step 214, root key distribution system 104 (see FIG. 1) receives the importer public key from the first HSM.

In step 216, root key distribution system 104 (see FIG. 1) generates, signs, and transmits to the source HSM 120 (see FIG. 1) a request to export the master key and the public importer key.

After step 216, the process of FIGS. 2A-2C continues with step 218 in FIG. 2B. Subsequent to step 216 and prior to step 218, source HSM 120 (see FIG. 1) receives the request transmitted in step 216, generates an exporter key pair comprising an exporter private key and an exporter public key, derives a transport key from the importer public key and the exporter private key, wraps the master key with the transport key, generates a response to the request transmitted in step 216, and destroys the importer public key, the exporter private key, and the transport key. As used herein, wrapping the master key means encrypting the master key using another key.

In step 218, root key distribution system 104 (see FIG. 1) receives the wrapped master key and the exporter public key in the response.

In step 220, root key distribution system 104 (see FIG. 1) generates, signs, and transmits to the first HSM the wrapped master key and the exporter public key.

Subsequent to step 220 and prior to step 222, the first HSM receives the wrapped master key and exporter public key transmitted in step 220, derives a transport key from the importer private key and the exporter public key, unwraps the master key with the transport key derived from the importer private key and the exporter public key, places the unwrapped master key in a new master key register in an uncommitted state. The unwrapped master key placed in the new master key register is also referred to herein as a pending master key. As used herein, unwrapping the master key means decrypting a wrapped master key by using another key.

In step 222, root key distribution system 104 (see FIG. 1) receives an indication that the import of the master key to the first HSM is completed.

In step 224, root key distribution system 104 (see FIG. 1) generates, signs, and transmits a command to the first HSM to commit the pending master key.

Subsequent to step 224 and prior to step 226, the first HSM receives the command transmitted in step 224, and in response to the received command, changes the state of the pending master key from uncommitted to committed.

In step 226, root key distribution system 104 (see FIG. 1) receives an indication from the first HSM that the pending master key is in a committed state.

In step 228, root key distribution system 104 (see FIG. 1) generates, signs, and transmits a command to the first HSM to finalize the pending master key.

Subsequent to step 228 and prior to step 230, the first HSM receives the command transmitted in step 228 and sets the pending master key to become active (i.e., activates the pending master key).

In step 230, root key distribution system 104 (see FIG. 1) receives an indication from the first HSM that the pending master key is activated.

After step 230, the process of FIGS. 2A-2C continues with step 232 in FIG. 2C.

In step 232, root key distribution system 104 (see FIG. 1) determines whether there is another HSM in the HSM cluster that has not been used in the loop starting at step 212 (see FIG. 2A). If root key distribution system 104 (see FIG. 1) determines that there is another HSM (i.e., a next HSM), then the Yes branch of step 232 is taken and the process of FIGS. 2A-2C loops back to step 212 (see FIG. 2A), with the first HSM in the descriptions of steps 212 through step 230 being replaced by the next HSM.

If root key distribution system 104 (see FIG. 1) determines in step 232 that there not another HSM in the HSM cluster to be used in the aforementioned loop, then the No branch of step 232 is taken and step 234 is performed.

In step 234, root key distribution system 104 (see FIG. 1) sends to the computer system of the administrator an indication that the distribution of the master key within the HSM cluster is completed.

The process of FIGS. 2A-2C ends at an end node 236.

Computer System

Figure 3:
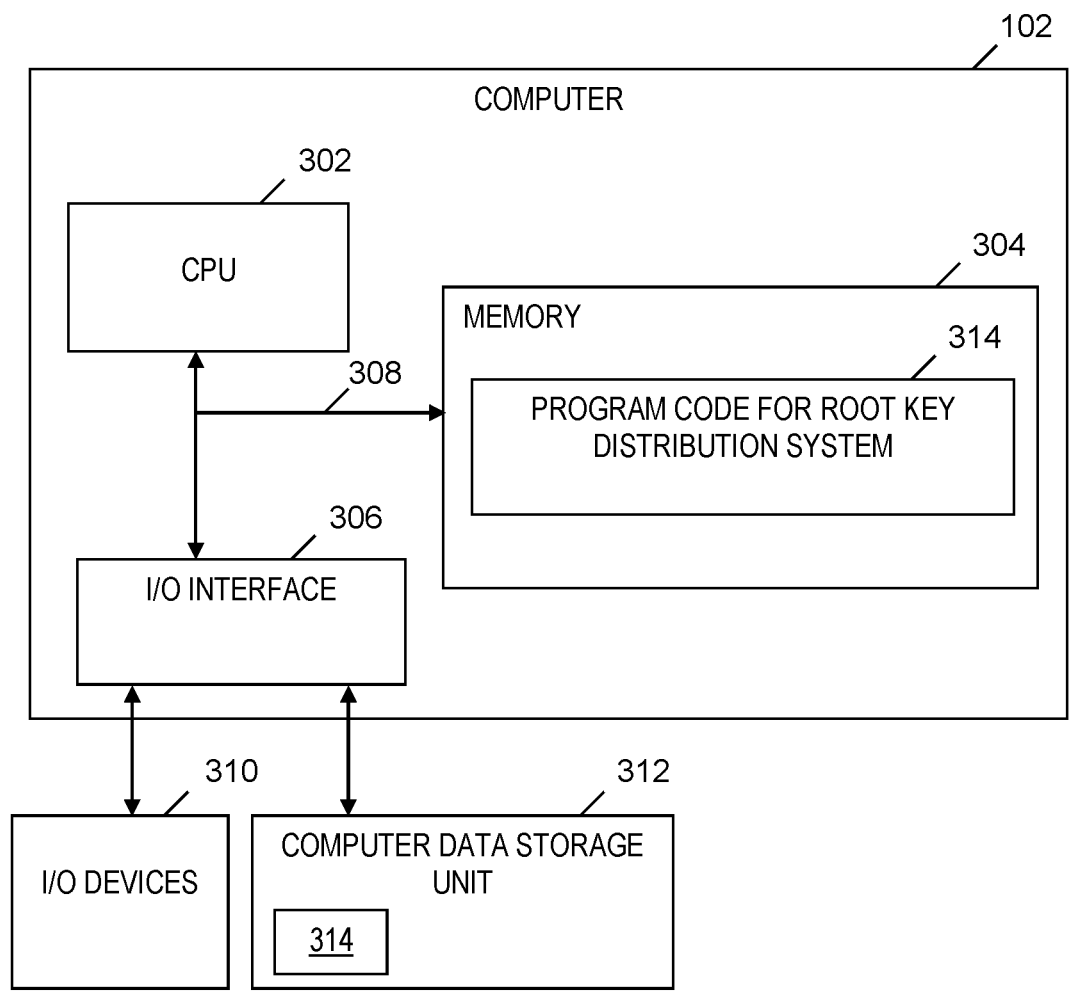
FIG. 3 is a block diagram of a computer that is included in the system of FIG. 1 and that implements the process of FIGS. 2A-2C, in accordance with embodiments of the present invention.

FIG. 3 is a block diagram of a computer that is included in the system of FIG. 1 and that implements the process of FIGS. 2A-2C, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for root key distribution system 104 (see FIG. 1) to perform a method of securely distributing a root key to an HSM in an HSM cluster, where the instructions are executed by CPU 302 via memory 304. CPU 302 may include a single processing unit or processor or be distributed across one or more processing units or one or more processors in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems or a plurality of computer readable storage media in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes one or more known computer readable storage media, where a computer readable storage medium is described below. In one embodiment, computer data storage unit 312 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 304 and/or storage unit 312 may store computer program code 314 that includes instructions that are executed by CPU 302 via memory 304 to securely distribute a root key to an HSM in an HSM cluster. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to securely distributing a root key to an HSM in an HSM cluster. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to securely distribute a root key to an HSM in an HSM cluster. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of securely distributing a root key to an HSM in an HSM cluster.

While it is understood that program code 314 for securely distributing a root key to an HSM in an HSM cluster may be deployed by manually loading directly in client, server and proxy computers (not shown) via loading a computer-readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of securely distributing a root key to an HSM in an HSM cluster. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2C) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
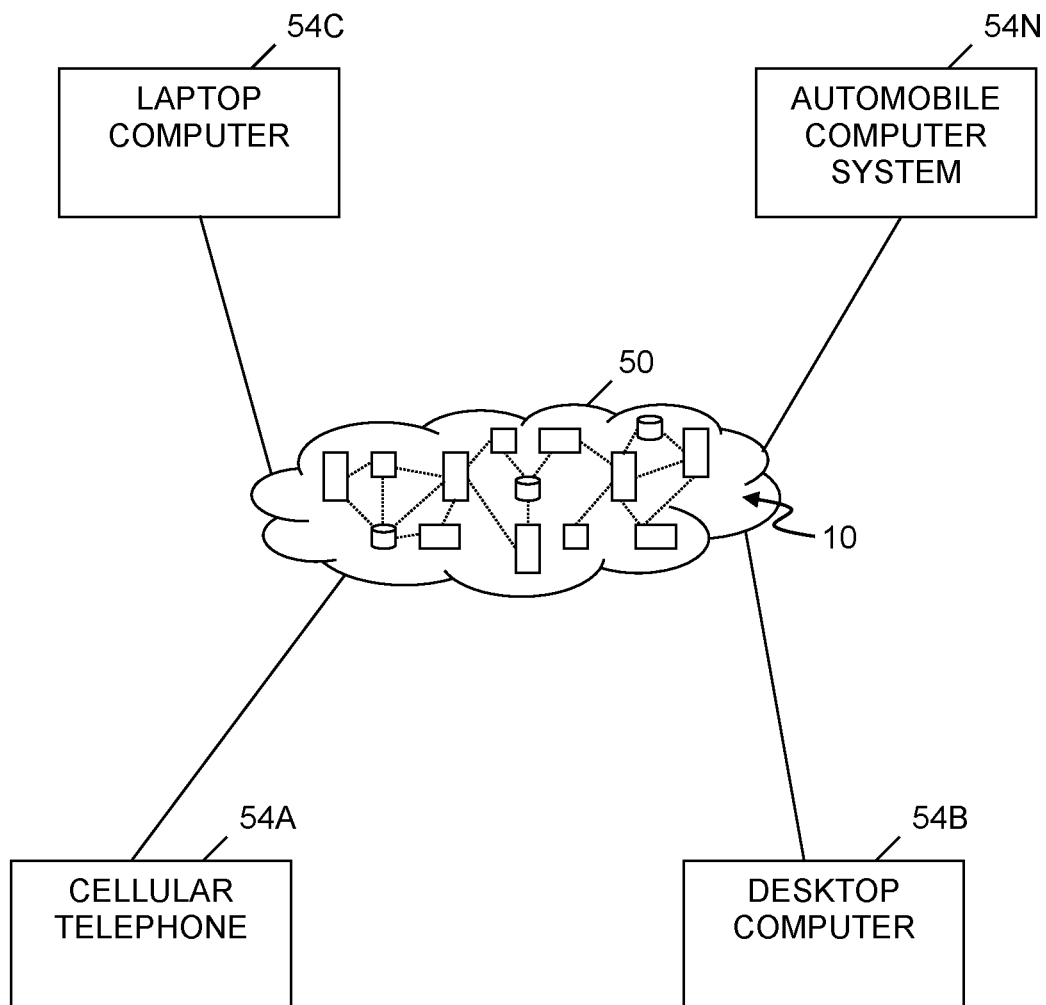
FIG. 4 depicts a cloud computing environment, in accordance with embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
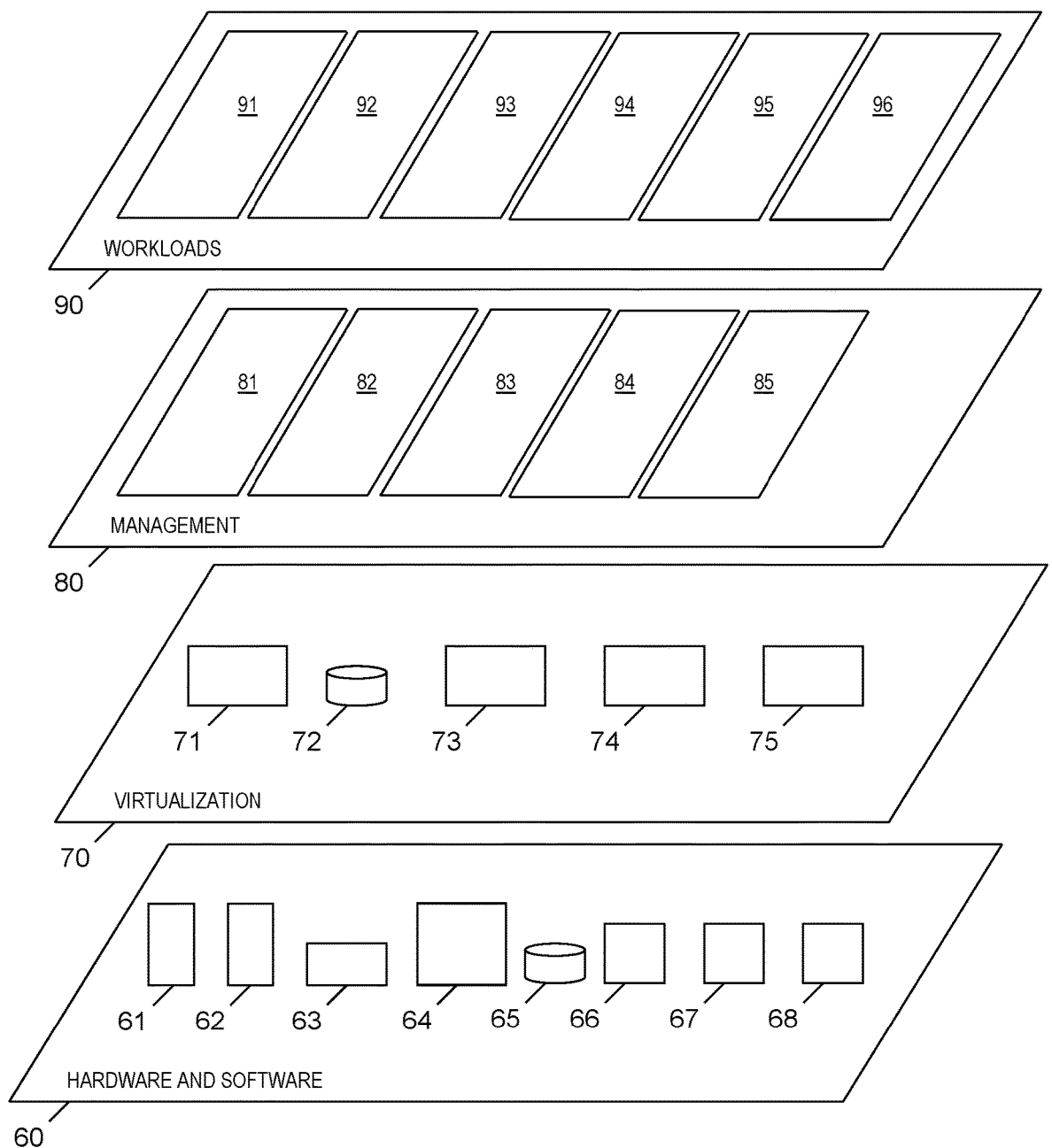
FIG. 5 depicts abstraction model layers, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure root key distribution to an HSM in an HSM cluster 96.

What is claimed is:

1. A computer system comprising:
   a central processing unit (CPU);
   a memory coupled to the CPU; and
   one or more computer readable storage media coupled to the CPU, the one or more computer readable storage media collectively containing instructions that are executed by the CPU via the memory to implement a method of distributing a root key to a hardware security module (HSM) of an HSM cluster, the method comprising:
      the computer system transmitting a first command to a source HSM to create a master key, the first command being signed by an administrator of HSMs in the HSM cluster;
      the computer system receiving, from the source HSM, a fingerprint of the master key in a response signed by the source HSM using a module signing key hardcoded into the source HSM at a manufacturing time of the source HSM;
      the computer system transmitting a second command to a first HSM in the HSM cluster, the second command generating an importer key pair comprising an importer private key and an importer public key;
      in response to the transmitting the second command, the computer system receiving the importer public key from the first HSM;
      the computer system transmitting to the source HSM a request to export the master key and the importer public key;
      in response to the transmitting the request, the computer system receiving from the source HSM (i) the master key wrapped with a transport key and (ii) an exporter public key, the transport key derived from the importer public key and an exporter private key;
      the computer system transmitting, to the first HSM, (i) the master key wrapped with the transport key and (ii) the exporter public key; and
      the computer system activating the master key in the first HSM.

2. The computer system of claim 1, further comprising the first HSM, wherein the method further comprises:
   subsequent to the transmitting the master key and the exporter public key, the first HSM deriving the transport key from the exporter public key and the importer private key stored by the first HSM;
   the first HSM unwrapping the master key with the transport key; and
   the first HSM registering the unwrapped master key as a new master key in a register of the first HSM in an uncommitted state.

3. The computer system of claim 2, wherein the method further comprises:
   the first HSM destroying the importer private key, the exporter public key, and the transport key.

4. The computer system of claim 2, wherein the method further comprises:
   the computer system changing the master key registered in the register of the first HSM from the uncommitted state to a committed state.

5. The computer system of claim 1, wherein the method further comprises:

the computer system using the activated master key as a root key in a key management service, which provides a customer with a total control over encryption keys that protect data in a cloud computing environment without requiring a management of the root key outside of the key management service, and which prevents a cloud service provider from accessing the data.

6. The computer system of claim 1, wherein the method further comprises:
the computer system transmitting a command to a second HSM in the HSM cluster to generate a second importer key pair comprising a second importer private key and a second importer public key, the second importer key pair being different from the importer key pair;
the computer system receiving the second importer public key from the second HSM;
the computer system transmitting to the source HSM a request to export the master key and the second importer public key;
the computer system receiving from the source HSM (i) the master key wrapped with a second transport key and (ii) a second exporter public key, the second transport key being different from the transport key and derived from the second importer public key and a second exporter private key;
the computer system transmitting, to the second HSM, (i) the master key wrapped with the second transport key and (ii) the second exporter public key, wherein the second HSM derives the second transport key from the second exporter public key and the second importer private key stored by the second HSM, unwraps the master key with the second transport key, and registers the master key in a register of the second HSM in an uncommitted state; and
the computer system setting the master key registered in the second HSM to a committed state and activating the master key stored by the second HSM.

7. The computer system of claim 1, further comprising the source HSM, wherein the method further comprises:
the source HSM receiving the request to export the master key and the importer public key;
in response to the receiving the request to export the master key and the importer public key, the source HSM generating an exporter key pair comprising the exporter private key and the exporter public key;
the source HSM deriving the transport key from the importer public key and the exporter private key;
the source HSM wrapping the master key with the transport key;
the source HSM generating a response to the request, the response including (i) the master key wrapped with the transport key and (ii) the exporter public key; and
the source HSM destroying the importer public key, the exporter private key, and the transport key.

8. The computer system of claim 7, wherein the method further comprises:
in response to the transmitting the first command, the source HSM validating a signature of the first command by using a signing public key;
the source HSM generating the master key; and
the source HSM generating and signing a response to the first command using the module signing key.

9. The computer system of claim 1, wherein the method further comprises:
the computer system establishing the administrator of the HSMs in the HSM cluster; and
the computer system uploading a certificate from a pair of private and public keys to the HSMs, the certificate authorizing commands subsequent to each HSM of the HSMs being taken out of an imprint mode.

10. A computer program product for distributing a root key to a hardware security module (HSM) of an HSM cluster, the computer program product comprising:
one or more computer readable storage devices having computer readable program code collectively stored on the one or more computer readable storage devices, the computer readable program code being executed by a central processing unit (CPU) of a computer system to cause the computer system to perform a method comprising:
the computer system transmitting a first command to a source HSM to create a master key, the first command being signed by an administrator of HSMs in the HSM cluster;
the computer system receiving, from the source HSM, a fingerprint of the master key in a response signed by the source HSM using a module signing key hardcoded into the source HSM at a manufacturing time of the source HSM;
the computer system transmitting a second command to a first HSM in the HSM cluster, the second command generating an importer key pair comprising an importer private key and an importer public key;
in response to the transmitting the second command, the computer system receiving the importer public key from the first HSM;
the computer system transmitting to the source HSM a request to export the master key and the importer public key;
in response to the transmitting the request, the computer system receiving from the source HSM (i) the master key wrapped with a transport key and (ii) an exporter public key, the transport key derived from the importer public key and an exporter private key;
the computer system transmitting, to the first HSM, (i) the master key wrapped with the transport key and (ii) the exporter public key; and
the computer system activating the master key in the first HSM.

11. The computer program product of claim 10, wherein the method further comprises:
subsequent to the transmitting the master key and the exporter public key, the computer system deriving the transport key from the exporter public key and the importer private key stored by the first HSM;
the computer system unwrapping the master key with the transport key; and
the computer system registering the unwrapped master key as a new master key in a register of the first HSM in an uncommitted state.

12. The computer program product of claim 11, wherein the method further comprises:
the computer system destroying the importer private key, the exporter public key, and the transport key.

13. The computer program product of claim 11, wherein the method further comprises:
the computer system changing the master key registered in the register of the first HSM from the uncommitted state to a committed state.

14. The computer program product of claim 10, wherein the method further comprises:
the computer system using the activated master key as a root key in a key management service, which provides a customer with a total control over encryption keys that protect data in a cloud computing environment without requiring a management of the root key outside of the key management service, and which prevents a cloud service provider from accessing the data.

15. The computer program product of claim 10, wherein the method further comprises:
the computer system transmitting a command to a second HSM in the HSM cluster to generate a second importer key pair comprising a second importer private key and a second importer public key, the second importer key pair being different from the importer key pair;
the computer system receiving the second importer public key from the second HSM;
the computer system transmitting to the source HSM a request to export the master key and the second importer public key;
the computer system receiving from the source HSM (i) the master key wrapped with a second transport key and (ii) a second exporter public key, the second transport key being different from the transport key and derived from the second importer public key and a second exporter private key;
the computer system transmitting, to the second HSM, (i) the master key wrapped with the second transport key and (ii) the second exporter public key, wherein the second HSM derives the second transport key from the second exporter public key and the second importer private key stored by the second HSM, unwraps the master key with the second transport key, and registers the master key in a register of the second HSM in an uncommitted state; and
the computer system setting the master key registered in the second HSM to a committed state and activating the master key stored by the second HSM.

16. The computer program product of claim 10, wherein the method further comprises:
the computer system receiving the request to export the master key and the importer public key;
in response to the receiving the request to export the master key and the importer public key, the computer system generating an exporter key pair comprising the exporter private key and the exporter public key;
the computer system deriving the transport key from the importer public key and the exporter private key;
the computer system wrapping the master key with the transport key;
the computer system generating a response to the request, the response including (i) the master key wrapped with the transport key and (ii) the exporter public key; and
the computer system destroying the importer public key, the exporter private key, and the transport key.

17. The computer program product of claim 16, wherein the method further comprises:
in response to the transmitting the first command, the computer system validating a signature of the first command by using a signing public key;
the computer system generating the master key; and
the computer system generating and signing a response to the first command using the module signing key.

18. A computer-implemented method comprising:
transmitting, by one or more processors, a first command to a source HSM to create a master key, the first command being signed by an administrator of HSMs in the HSM cluster;
receiving, by the one or more processors and from the source HSM, a fingerprint of the master key in a response signed by the source HSM using a module signing key hardcoded into the source HSM at a manufacturing time of the source HSM;
transmitting, by the one or more processors, a second command to a first HSM in the HSM cluster, the second command generating an importer key pair comprising an importer private key and an importer public key;
in response to the transmitting the second command, receiving, by the one or more processors, the importer public key from the first HSM;
transmitting, by the one or more processors and to the source HSM, a request to export the master key and the importer public key;
in response to the transmitting the request, receiving, by the one or more processors and from the source HSM, (i) the master key wrapped with a transport key and (ii) an exporter public key, the transport key derived from the importer public key and an exporter private key;
transmitting, by the one or more processors and to the first HSM, (i) the master key wrapped with the transport key and (ii) the exporter public key; and
activating, by the one or more processors, the master key in the first HSM.

19. The method of claim 18, further comprising:
subsequent to the transmitting the master key and the exporter public key, deriving, by the one or more processors, the transport key from the exporter public key and the importer private key stored by the first HSM;
unwrapping, by the one or more processors, the master key with the transport key; and
registering, by the one or more processors, the unwrapped master key as a new master key in a register of the first HSM in an uncommitted state.

20. The method of claim 19, further comprising:
destroying, by the one or more processors, the importer private key, the exporter public key, and the transport key.

21. The method of claim 19, further comprising:
changing, by the one or more processors, the master key registered in the register of the first HSM from the uncommitted state to a committed state.

22. The method of claim 18, further comprising:
using, by the one or more processors, the activated master key as a root key in a key management service, which provides a customer with a total control over encryption keys that protect data in a cloud computing environment without requiring a management of the root key outside of the key management service, and which prevents a cloud service provider from accessing the data.

23. The method of claim 18, further comprising:
transmitting, by the one or more processors, a command to a second HSM in the HSM cluster to generate a second importer key pair comprising a second importer private key and a second importer public key, the second importer key pair being different from the importer key pair;
receiving, by the one or more processors, the second importer public key from the second HSM;
transmitting, by the one or more processors, to the source HSM a request to export the master key and the second importer public key;
receiving, by the one or more processors, from the source HSM (i) the master key wrapped with a second transport key and (ii) a second exporter public key, the second transport key being different from the transport key and derived from the second importer public key and a second exporter private key;

transmitting, by the one or more processors and to the second HSM, (i) the master key wrapped with the second transport key and (ii) the second exporter public key, wherein the second HSM derives the second transport key from the second exporter public key and the second importer private key stored by the second HSM, unwraps the master key with the second transport key, and registers the master key in a register of the second HSM in an uncommitted state; and setting, by the one or more processors, the master key registered in the second HSM to a committed state and activating the master key stored by the second HSM.

24. The method of claim 18, further comprising:

providing software as a service in a cloud environment, the software being executed by a hardware processor in the cloud environment to implement the transmitting the first command, the receiving the fingerprint of the master key, the transmitting the second command, the receiving the importer public key, the transmitting the request to export the master key and the importer public key, the receiving the master key wrapped with the transport key and the exporter public key, the transmitting the master key wrapped with the transport key and the exporter public key, and the activating the master key in the first HSM.

25. The method of claim 8, further comprising:

providing at least one support service for at least one of creating, integrating, hosting, maintaining, and deploying computer readable program code in a computer, the program code being executed by a processor of the computer to implement the transmitting the first command, the receiving the fingerprint of the master key, the transmitting the second command, the receiving the importer public key, the transmitting the request to export the master key and the importer public key, the receiving the master key wrapped with the transport key and the exporter public key, the transmitting the master key wrapped with the transport key and the exporter public key, and the activating the master key in the first HSM.

* * * * *